(12) United States Patent
Tsuzuki et al.

(10) Patent No.: US 9,045,077 B2
(45) Date of Patent: Jun. 2, 2015

(54) VEHICLE APPROACH WARNING APPARATUS

(75) Inventors: Haruyuki Tsuzuki, Toyota (JP); Chikara Yamamoto, Hekinan (JP); Tomonori Suzuki, Seto (JP)

(73) Assignees: ANDEN CO., LTD., Anjo (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 31 days.

(21) Appl. No.: 14/117,394

(22) PCT Filed: Jul. 4, 2012

(86) PCT No.: PCT/JP2012/004314
§ 371 (c)(1),
(2), (4) Date: Nov. 13, 2013

(87) PCT Pub. No.: WO2013/014865
PCT Pub. Date: Jan. 31, 2013

(65) Prior Publication Data
US 2014/0300455 A1     Oct. 9, 2014

(30) Foreign Application Priority Data
Jul. 27, 2011     (JP) ................ 2011-164502

(51) Int. Cl.
*B60Q 5/00*     (2006.01)
*B60L 3/00*     (2006.01)
(Continued)

(52) U.S. Cl.
CPC ............ *B60Q 5/008* (2013.01); *B60L 3/0015* (2013.01); *B60L 2250/10* (2013.01);
(Continued)

(58) Field of Classification Search
CPC ........ B60Q 5/006; B60Q 5/008; B60Q 11/00; B60Q 5/00; B60L 3/0015; B06B 2201/40
USPC ............. 340/425.5, 435, 436, 902, 903, 988; 701/22, 36
See application file for complete search history.

(56) References Cited

U.S. PATENT DOCUMENTS 4,326,273 A * 4/1982 Vancha .................... 367/112
4,825,211 A * 4/1989 Park ....................... 340/901
(Continued)

FOREIGN PATENT DOCUMENTS

JP     06-088849 A     3/1994
JP     09-307988 A     11/1997
(Continued)

OTHER PUBLICATIONS

International Search Report and Written Opinion of the International Searching Authority mailed Oct. 9, 2012 for the corresponding international application No. PCT/JP2012/004314 (with English translation).

Primary Examiner — Hung T Nguyen
(74) Attorney, Agent, or Firm — Posz Law Group, PLC

(57) ABSTRACT

A vehicle approach warning apparatus for abnormality detection in various abnormal modes is provided. In the vehicle approach warning apparatus, a sound generator output from the microcomputer passes an AMP and HPF, and an output voltage corresponding to the sound generator output is applied to a speaker to emit vehicle approach sound. The vehicle approach warning apparatus includes a voltage sensor circuit and outputs a check usage output as the sound generator output at the abnormality detection. A single frequency output that is within a resonance frequency band of the speaker and that can be poorly reproduced by the speaker is used as the check usage output. The abnormality detection is performed based on whether an integration circuit voltage outputted from the voltage sensor circuit is within a voltage range being an abnormality determination threshold.

5 Claims, 7 Drawing Sheets

(51) Int. Cl.
*B60L 3/04* (2006.01)
*B60L 3/12* (2006.01)
*B06B 1/02* (2006.01)

(52) U.S. Cl.
CPC ............ *B60L 3/0023* (2013.01); *B60L 3/0046* (2013.01); *B60L 3/04* (2013.01); *B60L 3/12* (2013.01); *B60L 2240/12* (2013.01); *B60L 2250/26* (2013.01); *B06B 1/0207* (2013.01); *B06B 2201/40* (2013.01); *B06B 2201/70* (2013.01); *B60L 3/0069* (2013.01); *B60L 2250/22* (2013.01)

(56) References Cited

U.S. PATENT DOCUMENTS

| | | | | |
|---|---|---|---|---|
| 5,012,221 | A | * | 4/1991 | Neuhaus et al. ............ 340/384.5 |
| 5,406,492 | A | * | 4/1995 | Suzuki ........................ 701/428 |
| 2004/0036627 | A1 | * | 2/2004 | Knoski et al. ................. 340/902 |
| 2011/0093149 | A1 | * | 4/2011 | Tanaka ........................... 701/22 |

FOREIGN PATENT DOCUMENTS

| | | |
|---|---|---|
| JP | 2001-092465 A | 4/2001 |
| JP | 2004-136831 A | 5/2004 |
| JP | 2005-229596 A | 8/2005 |
| JP | 2008-085476 A | 4/2008 |

* cited by examiner

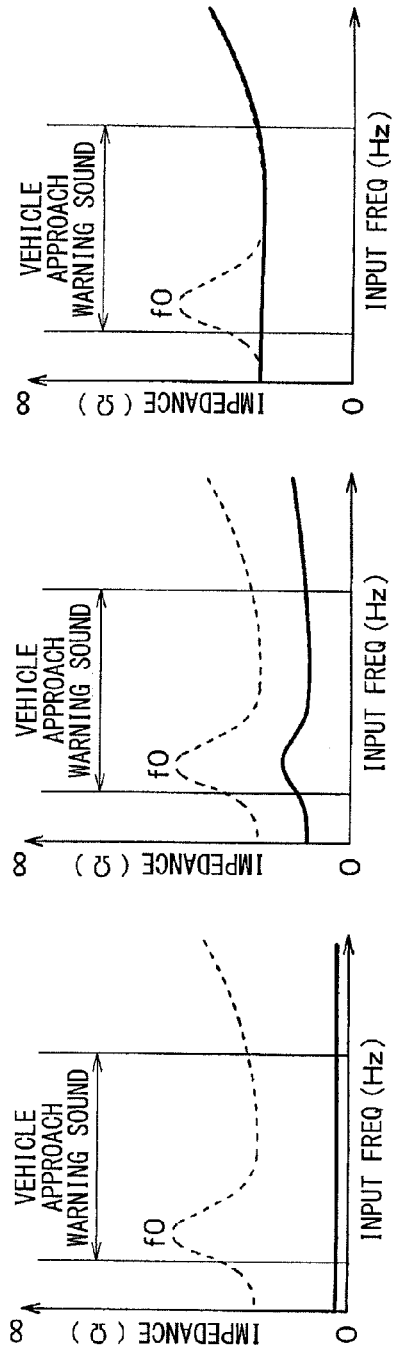
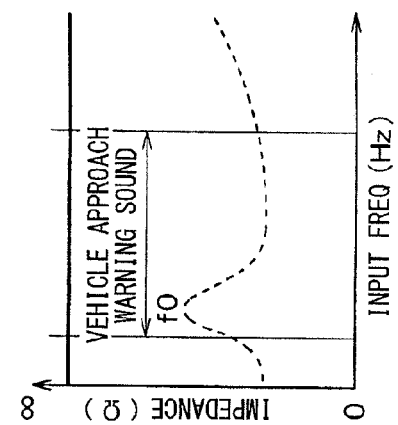
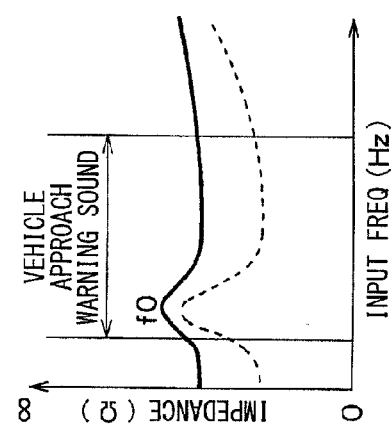
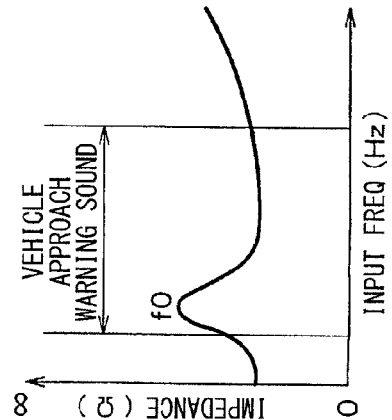

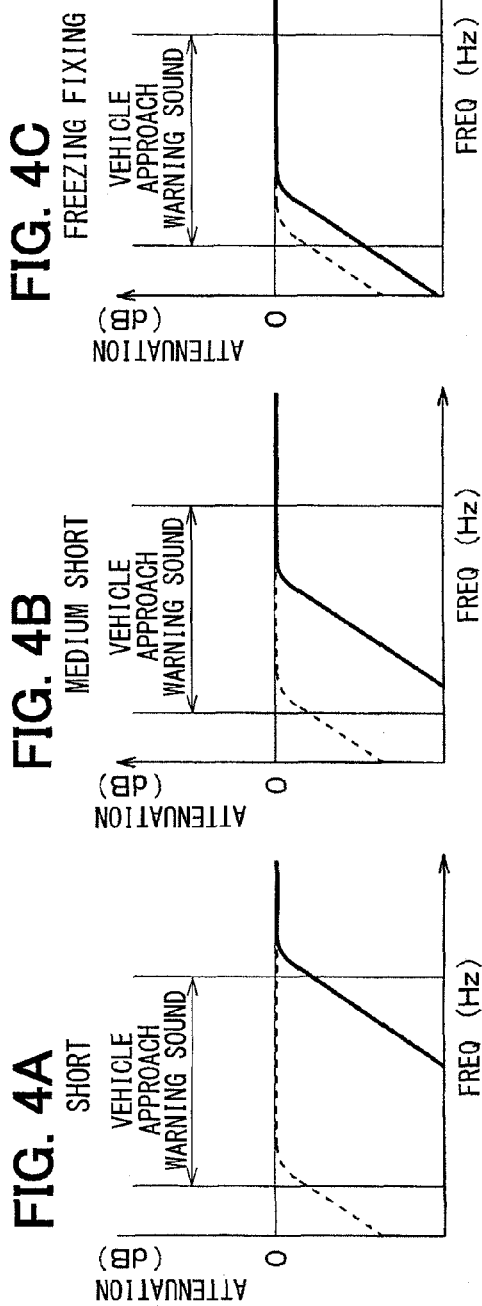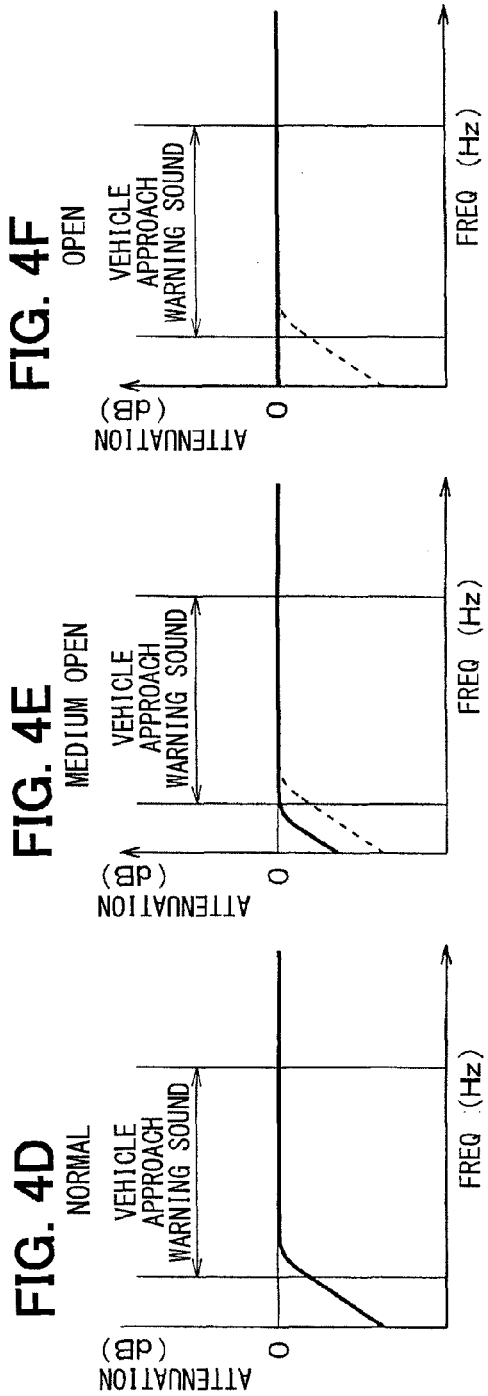

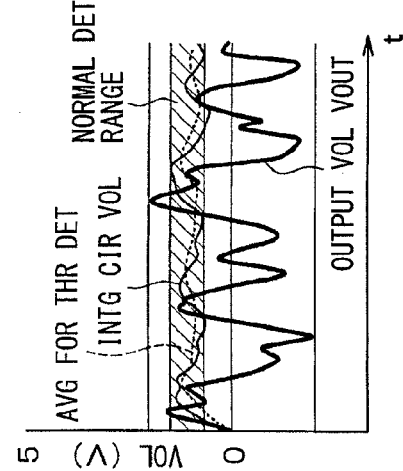
FIG. 5A SHORT
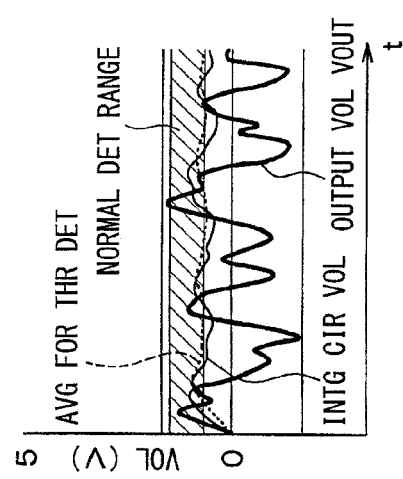
FIG. 5B MEDIUM SHORT
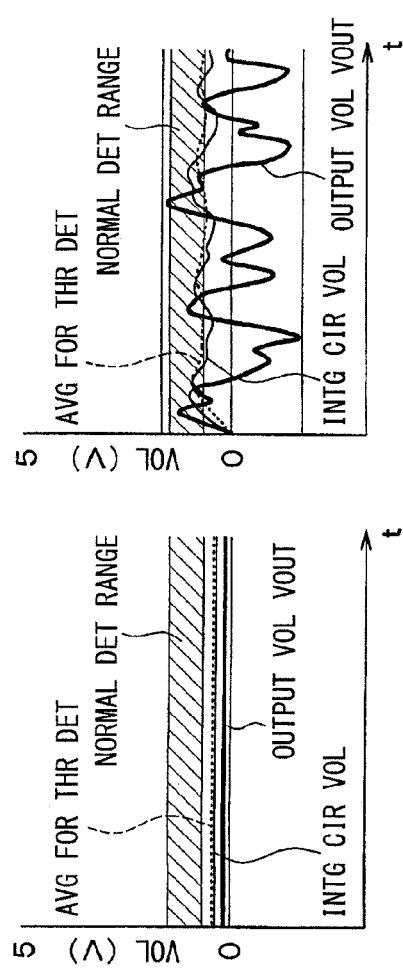
FIG. 5C FREEZING FIXING
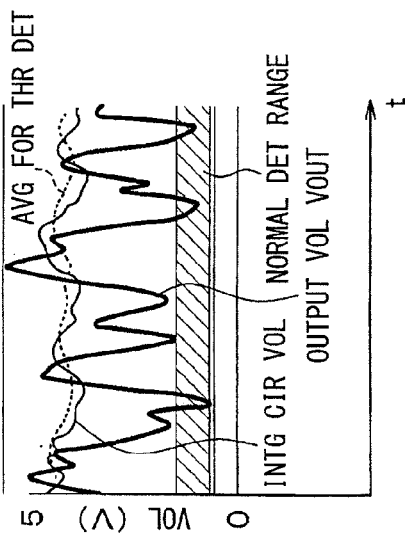
FIG. 5D NORMAL
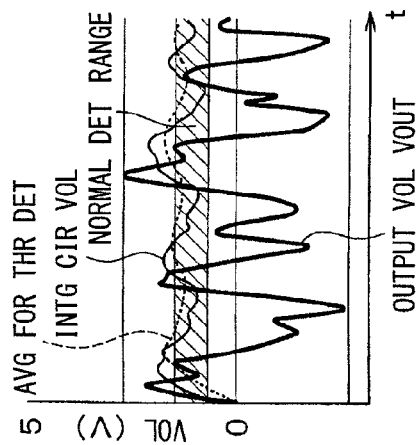
FIG. 5E MEDIUM OPEN
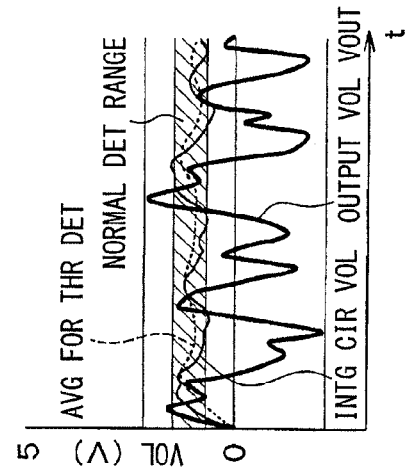
FIG. 5F OPEN

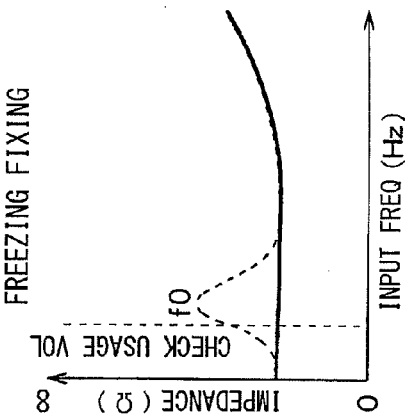
FIG. 6A SHORT
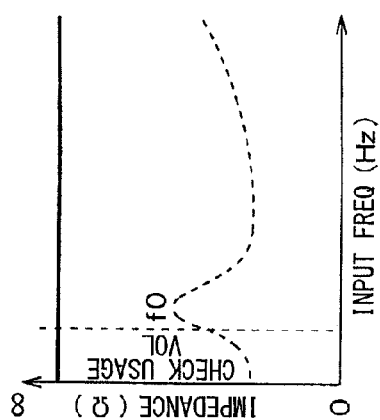
FIG. 6B MEDIUM SHORT
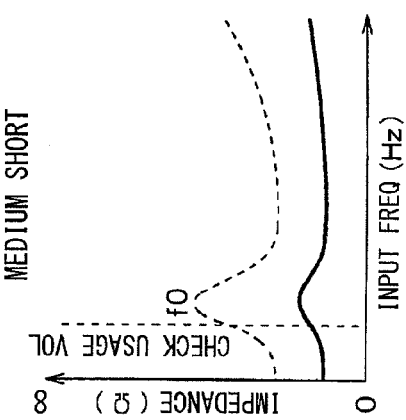
FIG. 6C FREEZING FIXING
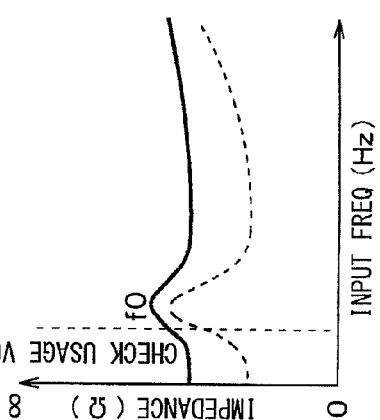
FIG. 6D NORMAL
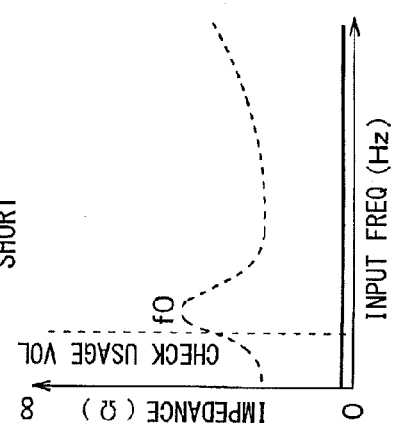
FIG. 6E MEDIUM OPEN
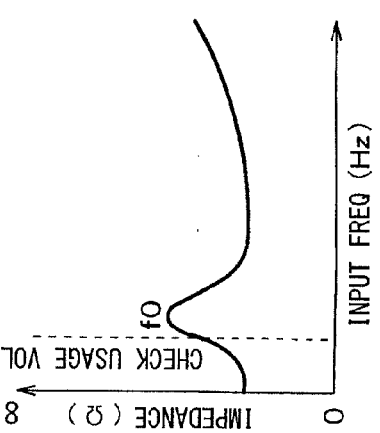
FIG. 6F OPEN

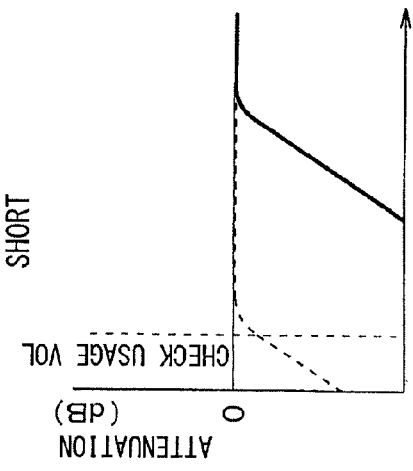
FIG. 7A SHORT
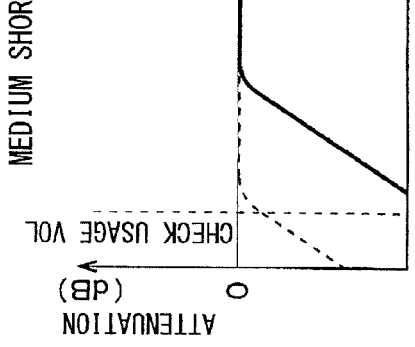
FIG. 7B MEDIUM SHORT
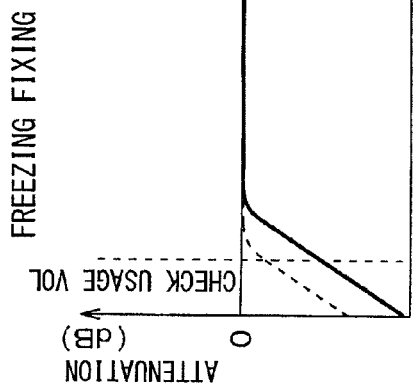
FIG. 7C FREEZING FIXING
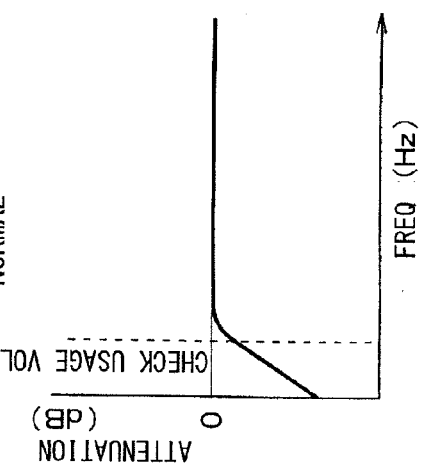
FIG. 7D NORMAL
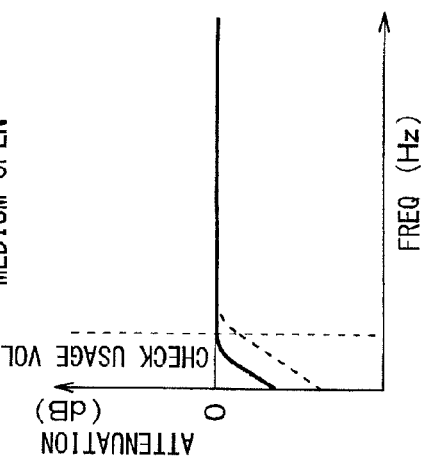
FIG. 7E MEDIUM OPEN
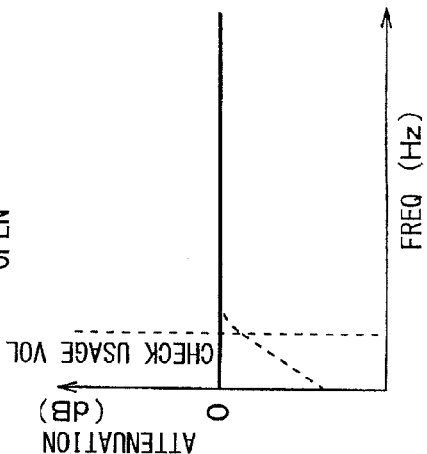
FIG. 7F OPEN

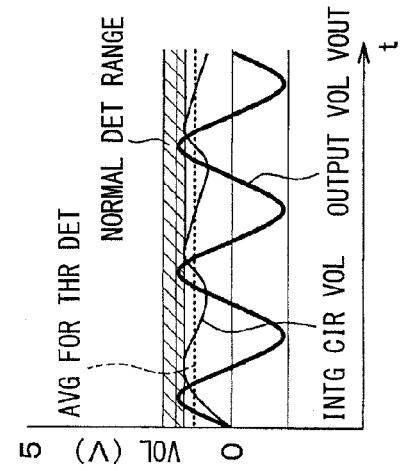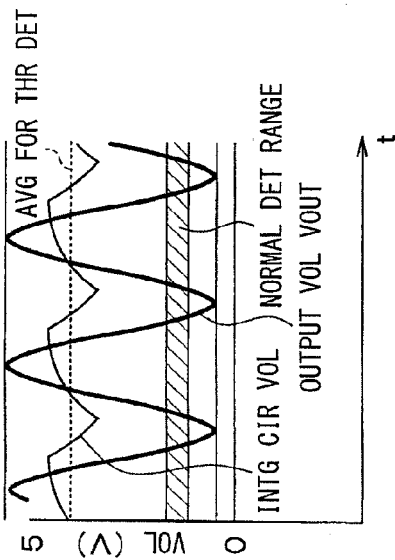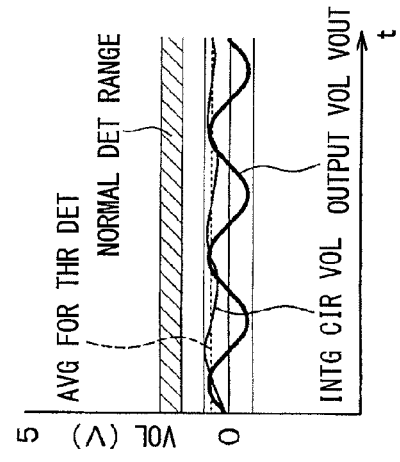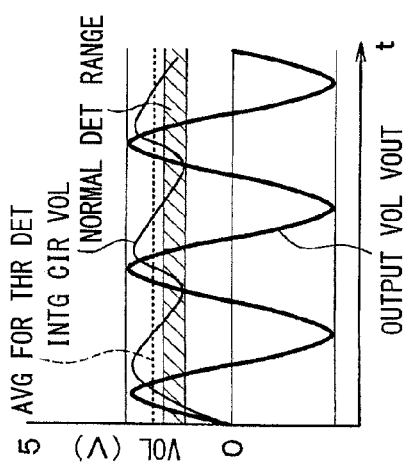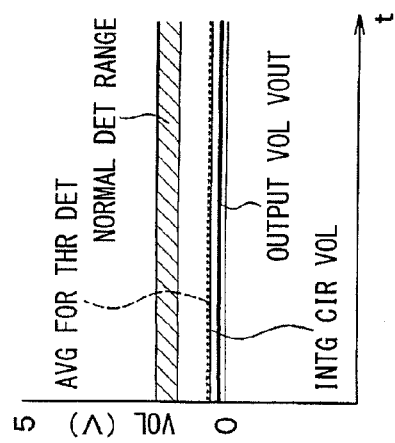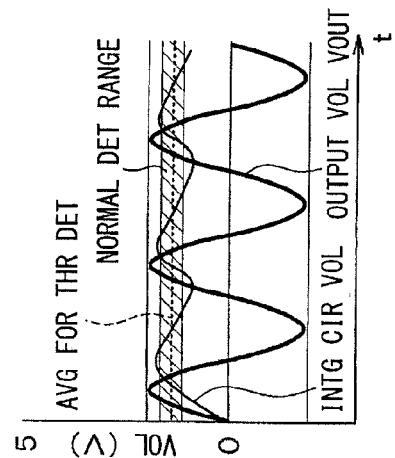

VEHICLE APPROACH WARNING APPARATUS

CROSS REFERENCE TO RELATED APPLICATIONS

The present application is a U.S. national stage application of PCT/JP2012/004314 filed on Jul. 4, 2012 and is based on Japanese Patent Application No. 2011-164502 field on Jul. 27, 2011, the disclosures of which are incorporated herein by reference.

TECHNICAL FIELD

The present disclosure relates to a vehicle approach warning apparatus that generates sound from a vehicle to warn surroundings about approach of the vehicle.

BACKGROUND

Electric vehicles (EV) and hybrid vehicles (HV) generate small noise due to theirs structures and it is difficult for a pedestrian to notice approach of these vehicles. In recent years, it becomes popular to equip EV and HV with a vehicle approach warning apparatus, which generates a vehicle approach warning sound such as pseudo engine sound to increase reconcilability when the pedestrian or the like is preset near the vehicle (see Patent Literature 1 for example).

In connection with a vehicle approach warning apparatus, the inventors of the present application have found the following.

In the above-described vehicle approach warning apparatus, if a speaker has a certain abnormality and cannot emit the sound, a vehicle function to warn a pedestrian about approach of the vehicle is lost. When the driver continues to drive without being aware that the vehicle approach warning apparatus does not actually emit the sound, the pedestrian has a difficulty in noticing the approach of the vehicle although the driver is driving on assumption that the vehicle approach warning sound is being emitted. For this reason, it is necessary to detect an abnormality of the vehicle approach warning apparatus.

A conceivable abnormality detection method of a vehicle approach warning apparatus uses a current flowing to a speaker in the sound emission (referred to hereinafter as a speaker current) or a voltage applied to the speaker in the sound emission (referred to hereinafter as a speaker voltage). Specifically, the pseudo engine sound or the pseudo motor sound generated by the vehicle approach warning apparatus has a time-variable frequency component or sound volume, and thus, the speaker current or speaker voltage constantly varies. Therefore, in extreme events such as no-flow of the current in a speaker output wire in open-circuit (disconnection) of the speaker and flow of an excessively large direct current in the speaker output wire in short-circuit of the speaker, it is possible to detect these abnormalities by monitoring a sensor current or a sensor voltage in the sound emission with a current sensor circuit or a voltage sensor circuit and comparing it with a determination threshold for speaker open-circuit abnormality or speaker short-circuit abnormality.

However, in cases of an abnormal mode of freezing and fixing of a speaker cone and an medium abnormal mode, the above-described method cannot detect abnormalities. The medium abnormal mode includes a mode in which the speaker is on the verge of open-circuit, that is, an impedance in a path of the speaker output wire is excessively large. The medium abnormal mode includes another mode such as a layer-short-circuit, in which the speaker is on the verge of short-circuit, that is, the impedance reduces than in a normal state due to partial-short-circuit. Specifically, in these abnormal modes, the speaker current varies in the sound emission, and thus, it is impossible to accurately detect abnormalities by monitoring the sensor current or the sensor voltage in the sound emission with the current sensor circuit or the voltage sensor circuit and comparing it with the determination threshold for speaker open-circuit abnormality or short-circuit abnormality.

PATENT LITERATURE

Patent literature 1: JP2004-136831A

SUMMARY

In view of the foregoing, it is an object of the present disclosure to provide a vehicle approach warning apparatus that can detect abnormalities in various abnormal modes.

According to one example of the present disclosure, there is provided a vehicle approach warning apparatus for emitting a vehicle approach warning sound from a sounding body mounted to a vehicle to warn about approach of the vehicle. The vehicle approach warning apparatus comprises: an approach warning sound waveform creation portion that generates a sound generator output corresponding to an approach warning sound waveform for creating the vehicle approach warning sound emitted from the sounding body; a power amplifier that generates an input voltage, which depends on the sound generator output; a high pass filter that outputs an output voltage by filtering a low frequency component of the input voltage inputted to the high pass filter, and that applies the output voltage to the sounding body; a voltage sensor circuit that includes an integration circuit for integrating the output voltage, and that outputs as an integration circuit voltage the output voltage integrated with the integration circuit; and an abnormality monitor portion that monitors the integration circuit voltage outputted from the voltage sensor circuit, and that performs abnormality detection in the sounding body based on the integration circuit voltage. When an abnormality of the sounding body is detected with the abnormality monitor portion, the vehicle approach warning apparatus vehicle alerts it via an alarm device. At a time of the abnormality detection, the approach warning sound waveform creation portion generates, as a check usage output, the sound generator output whose frequency is lower than a resonance frequency in a resonance frequency band of the sounding body. When the output voltage is applied to the sounding body via the power amplifier and the high pass filter based on the sound generator output generated as the check usage output at the time of the abnormality detection, the abnormality monitor portion performs the abnormality detection in the sounding body by making a comparison between a prestored abnormality determination threshold and an input of the integration circuit voltage, which is the output voltage integrated with the integration circuit.

This vehicle approach warning apparatus, which emits the vehicle approach warning sound by putting the sound generator output through the power amplifier and the high pass filter, includes the voltage monitor circuit for monitoring the output voltage and generates the check usage output as the sound generator output at the time of the abnormality detection. Additionally, the abnormality detection is performed based on whether the integration circuit voltage outputted from the voltage monitor circuit is within or out of the voltage range being the abnormality detection threshold.

BRIEF DESCRIPTION OF THE DRAWINGS

The above and other objects, features and advantages of the present invention will become more apparent from the following detailed description made with reference to the accompanying drawings. In the drawings:

FIGS. 3(a) to 3(f) are diagrams illustrating a relation of variation in input frequency and impedance of a speaker 3 between abnormal modes and a normal state;

FIGS. 4(a) to 4(f) are diagrams illustrating a relation of variation in frequency of sound output and frequency characteristic of HPF 24 between abnormal modes and a normal state;

FIGS. 5(a) to 5(f) are diagrams illustrating voltage waveforms and the like between abnormal modes and a normal state;

FIGS. 6(a) to 6(f) are diagrams illustrating a relation of variation in input frequency and impedance of a speaker 3 between abnormal modes and a normal state;

FIGS. 7(a) to 7(f) are diagrams illustrating a relation of variation in frequency of sound output and frequency characteristic of a HPF 24 between abnormal modes and a normal state; and FIGS. 8(a) to 8(f) are diagrams illustrating voltage waveforms and the like between abnormal modes and a normal state.

EMBODIMENTS FOR CARRYING OUT THE INVENTION

Embodiments of the present disclosure will be described below with reference to the drawings. Between the below embodiments, same references are assigned to same or similar parts.

(First Embodiment)

Figure 1:
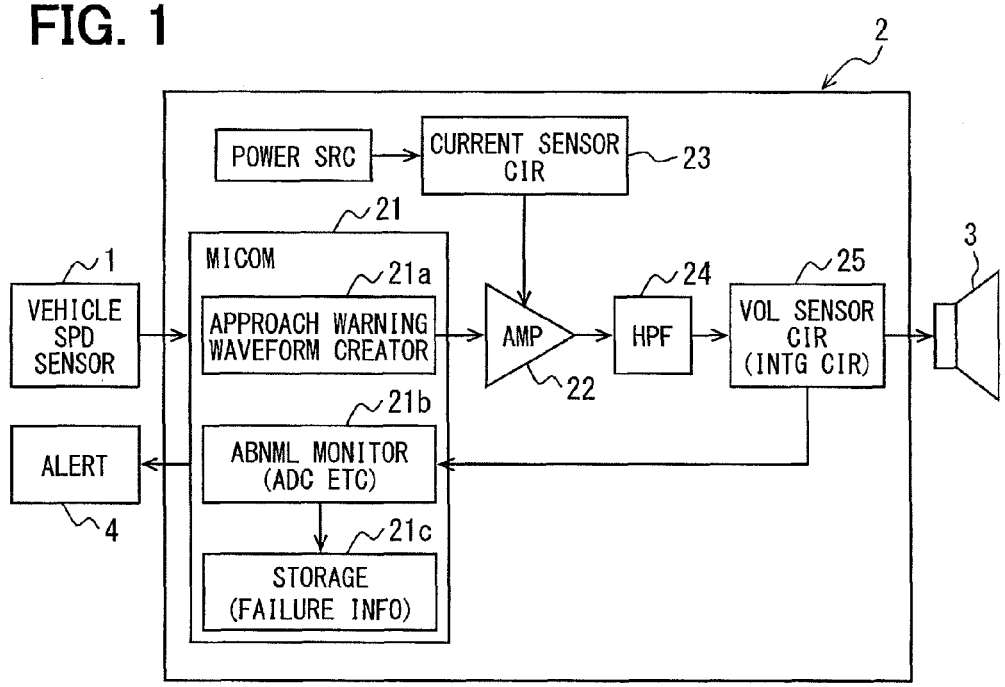
FIG. 1 is a block diagram illustrating a vehicle approach warning system including a vehicle approach warning apparatus according to a first embodiment.

FIG. 1 is a block diagram illustrating a vehicle approach warning system including a vehicle approach warning apparatus of the present embodiment. With reference to this drawing, the vehicle approach warning system including the vehicle approach warning apparatus of the present embodiment will be described.

As shown in FIG. 1, the vehicle approach warning system includes a vehicle speed sensor 1, a vehicle approach warning apparatus 2, a speaker 3 and an alarm device 4. In the vehicle approach warning system, the vehicle approach warning apparatus 2 emits sound from the speaker 3 serving as a sounding body, thereby warning a pedestrian or the like in the surroundings about approach of the vehicle. In this configuration, the vehicle approach warning apparatus 2 and the speaker 3 are separated elements. However, in another configuration, the speaker 3 and the vehicle approach warning apparatus 2 may be integrated.

The vehicle speed sensor 1 outputs a signal indicative of a traveling state of a vehicle as a vehicle speed detection signal. When the detection signal of the vehicle speed sensor 1 is inputted to the vehicle approach warning apparatus 2, the vehicle approach warning apparatus 2 generates a vehicle approach warning sound that depends on the vehicle speed.

The vehicle approach warning apparatus 2 includes a microcomputer 21, a power amplifier 22 (referred to hereinafter as AMP), a current sensor circuit 23, a high pass filter 24 (referred to hereinafter as HPF), and a voltage sensor circuit 25.

The microcomputer 21 includes an approach warning sound waveform creation portion 21a, an abnormality monitor portion 21b, a storage device 21c and the like.

The approach warning sound creation portion 21a includes a memory not shown, and further includes a digital analog converter (referred to hereinafter as DAC) or a PWM output unit, or the like. The memory stores a control program for sound emission, a PCM (pulse code modulation) data and the like. The PCM data is an encoded data obtained by converting magnitude of the sound into a data code. The memory further stores an arithmetic expression, a map or the like, which associates a sound pressure level with the vehicle speed indicated by the vehicle speed detection signal. In accordance with the control program stored in this memory, the approach warning sound creation portion 21a generates a sound generator output corresponding to the approach warning sound waveform in response to the input of the vehicle speed detection signal from the vehicle speed sensor 1, by calculating the sound pressure level corresponding to the vehicle speed using the arithmetic expression or the map, and setting and outputting the PCM data, which is set for the calculated pressure level, to the DAC, the PWM output unit or the like with respect to each predetermined sampling frequency. For example, the sound pressure level is set to increases with increasing vehicle speed, so that reconcilability of vehicle approach by a pedestrian or the like improves.

The abnormality monitor portion 21b detects, based on an output from the sensor circuit 25, whether the speaker 3 is normal or failed, that is, the abnormality monitor portion 21b performs abnormality detection. An abnormal modes include open-circuit (disconnection) of the speaker 3, medium open-circuit being the verge of the open-circuit, short-circuit, medium short-circuit being the verge of the short-circuit, and freezing and fixing of the speaker 3. Any of these abnormal modes is detected as an abnormal state by the abnormality monitor portion 21b. The abnormality monitor portion 21b calculates an average of voltage outputted from the sensor circuit 25. Based on whether or not the average is within a prestored voltage range being an abnormality determination threshold, the abnormality monitor portion 21b performs the abnormality detection. The voltage range being the abnormal determination threshold is a constant value. As described later, it is possible to set the constant value as the voltage range being the abnormal determination threshold by using a sound generator output with a constant frequency. The sound generator output with a constant frequency is called a check usage output. Details of the abnormality detection by the abnormality monitor portion 21b will be described later.

The storage device 21c records failure history information including information of a specific abnormal mode when the abnormality monitor portion 21b detects the failure of the speaker 3 by the abnormality detection. Contents stored in the storage device 21c in this way are used in failure diagnosis in a repair factory of an automobile dealer or the like to improve service and maintenance.

The AMP 22 applies a voltage corresponding to an output of the microcomputer 21 to the speaker 3, based on power supplied from a power source. In the below-description, this voltage inputted from the AMP 22 to the speaker 3 is called an input voltage VIN.

The current sensor circuit 23 detects magnitude of the current supplied from the power source to the AMP 22. The current sensor circuit 23 detects that the current supplied to the AMP 22 is an overcurrent. This detection result of the current sensor circuit 23 is inputted to the microcomputer 21. When the current supplied to the AMP 22 is an overcurrent, the microcomputer 21 takes measures, such as temporarily stopping the voltage application to the speaker 3 by, for example, stopping the supply of the current to the AMP 22. In this way, failure of the vehicle approach warning apparatus 2 or sound emission from the speaker 3 with unintended sound pressure due to the overcurrent are prevented.

The HPF 24 filters low frequency components of the input voltage VIN from the AMP 22 and passes only a highly frequency band. The HPF 24 includes, for example, a coupling capacitor.

The voltage sensor circuit 25 monitors a voltage that is applied to the speaker 3 after passing through the HPF 24. The voltage sensor circuit 25 includes an integration circuit. To the microcomputer 21, the voltage sensor circuit 25 inputs as an output of the voltage sensor circuit 25 an integrated value of the voltage applied to the speaker 3. The voltage applied to the speaker 3, which is monitored by the voltage sensor circuit 25, corresponds to a voltage outputted from the vehicle approach warning apparatus 2. In the below-description, this voltage is called an output voltage VOUT.

Figure 2:
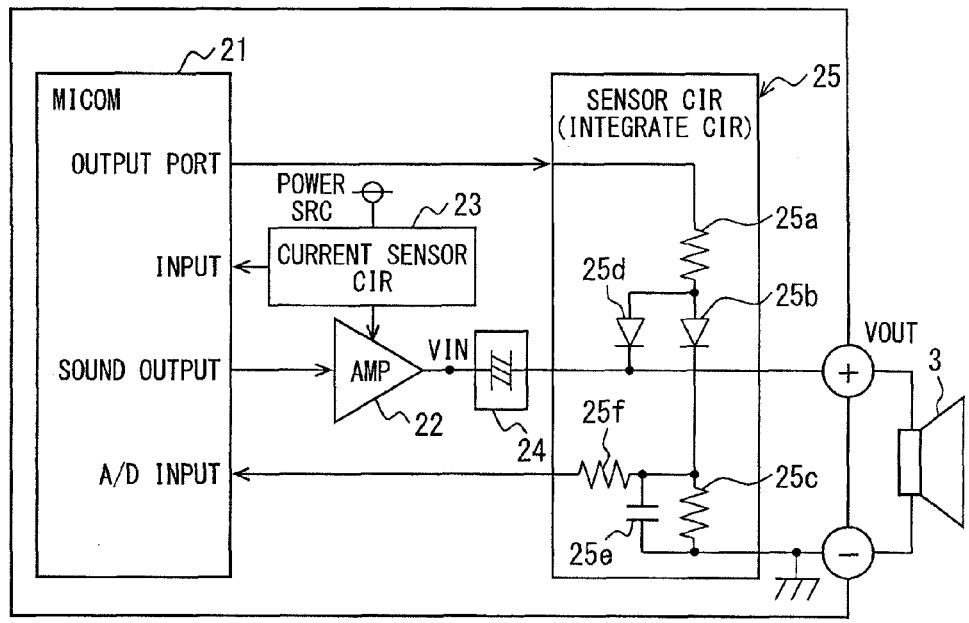
FIG. 2 is a circuit block diagram illustrating a specific configuration example of a voltage sensor circuit 25 equipped in a vehicle approach warning apparatus 2.

FIG. 2 is a circuit block diagram illustrating an example of a specific configuration of the above-configured voltage sensor circuit 25 equipped in the vehicle approach warning apparatus 2. In this diagram, the microcomputer 21 is omitted because it has the same configuration as in FIG. 1.

As described above, the sound generator output of the microcomputer 21a is inputted to the AMP 22. Based on the current supplied from the power source, the AMP 22 outputs the input voltage VIN to the speaker 3. This input voltage VIN is filtered by the HPF 24 including the coupling capacitor or the like and then applied to the speaker 3 as the output voltage VOUT of the vehicle approach warning apparatus 2. Thereby, the speaker 3 emits the vehicle approach warning sound with the sound pressure and the frequency that correspond to the sound generator output.

The voltage sensor circuit 25 is connected to a speaker output wire which conducts the output voltage VOUT. The voltage sensor circuit 25 integrates the output voltage VOUT with the integration circuit and inputs its integrated value to the microcomputer 21.

Specifically, the voltage sensor circuit 25 includes a charging current limiting resistor 25a, a first diode 25b, a discharge resistor 25c, a second diode 25d, a capacitor 25e, and an input limiting resistor 25f. The charging current limiting resistor 25a, the first diode 25b and the discharge resistor 25c are connected in series between an output port of the microcomputer 21 and GND. The second diode 25d is provided between the speaker output wire, which conducts the output voltage VOUT, and a connection point of the charging current limiting resistor 25a and the first diode 25b. The capacitor 25e is connected in parallel with the discharge resistor 25c. The input limiting resistor 25f is connected between the microcomputer 21 and a connection point of the first diode 25b and the discharge resistor 25c.

In the above-configured voltage sensor circuit 25, an anode of the first diode 25b and an anode of the second diode 25d are connected, and thus, a cathode potential of the first diode 25b is substantially a cathode potential of the second diode 25d. Further, since the second diode 25d is reverse-connected with respect to the speaker output wire, the half-wave-rectified output voltage VOUT can appear as a cathode potential of the first diode 25b and its cathode potential can be unaffected by voltage drop by Vf of the first, second diodes 25b, 25d.

Pull-up control of the voltage sensor circuit 25 is performed by using an electric potential of the output port of the microcomputer 21 as a reference. Based on an electric potential difference between the electric potential of the output port and the cathode potential of the first diode 25b, a current in a path of the charging current limiting resistor 25a, the first diode 25b and the discharge resistor 25c is flowed or interrupted. Additionally, the capacitor 25e is charged or discharged in accordance with an electric potential difference across the discharge resistor 25c. In the charging, the charging is performed via the charging current limiting resistor 25a, and thus, the charging current is prevented from being excessive. In the discharging, an A/D input voltage of the microcomputer 21 gently decreases by setting of a large resistance value of the discharge resistor 25c, and peak hold of the output voltage VOUT can be performed.

By inputting the charging voltage of the capacitor 25e to the microcomputer 21 via the input limiting resistor 25f, it is possible to input to the microcomputer 21a voltage corresponding to the integrated value of the output voltage VOUT.

In the above-configured vehicle approach warning system, when the vehicle speed detection signal from the vehicle speed sensor 1 is inputted to the microcomputer 21, the approach warning sound creation portion 21a generates the sound generator output that depends on the vehicle speed indicated by the vehicle speed detection signal. For example, in accordance with the control program stored in this memory, the approach warning sound creation portion 21a generates a sound generator output corresponding to the approach warning sound waveform, by calculating the sound pressure level corresponding to the vehicle speed using the arithmetic expression or the map, and setting and outputting the PCM data, which is set for the calculated pressure level, to the DAC, the PWM output unit or the like with respect to each predetermined sampling frequency.

Thereafter, the input voltage VIN corresponding to the sound generator output from the approach warning sound generation portion 21a is outputted via the AMP 22, and this input voltage VIN is filtered by the HPF 24 and then applied to the speaker 3 as the output voltage VOUT of the vehicle approach warning apparatus 2. Accordingly, the speaker 3 emits the vehicle approach warning sound corresponding to the vehicle speed and warns the pedestrian or the like about the approach of the vehicle.

Meanwhile, when the abnormality detection is performed, the check usage output is outputted as the sound generator output from the approach warning sound generation portion 21a. The check usage output is an output with a frequency contained in a speaker resonance frequency band. For example, the output for check is a single frequency output with a low frequency (e.g., less than or equal to 60 Hz) that is hardly recognized by user and is poorly reproduced by the speaker 3. Because of the low frequency poorly reproduced by the speaker 3, the sound emission from the speaker at a time of the abnormality detection is suppressed and uncomfortable feeling of the driver is avoided. As long as the vehicle approach warning sound is not generated, this abnormality detection can be performed any time. Thus, the abnormality detection can be constantly performed when the vehicle approach warning sound is not generated. It is possible to increase frequency of the abnormality detection.

The input voltage VIN corresponding to the check usage output is outputted via this AMP 22, and this input voltage VIN is filtered by the HPF 24 and then applied to the speaker 3 as the output voltage VOUT of the vehicle approach warning apparatus 2. Since the single frequency check usage voltage with the low frequency, which is hardly recognized by the user and poorly reproduced by the speaker 3, is used, although it dose not matter whether this causes the output of the vehicle approach warning sound from the speaker, it is possible to realize substantially no sound emission.

The output voltage VOUT in this timing is detected with the voltage sensor circuit 25 and its integrated value is inputted to the abnormality monitor portion 21b of the microcomputer 21. Based on this, the abnormality detection for the speaker 3 is performed using the abnormality monitor portion 21b by the below-described method. When the failure of the speaker 3 is detected, the abnormality monitor portion 21b informs the storage device 21c that the failure of the speaker 3 is detected, and additionally, the abnormality monitor portion 21b outputs a signal indicative of this to the alarm device 4, thereby informing the driver through the alarm device 4 that the speaker 3 has the failure.

For example, the alarm device 4 may include an alarm lamp in a meter, a display in an instrumental panel, or the like. The alarm device 4 may include a device visible to the driver or may include a device for whistling an alert sound. Through this kind of the alarm device 4, it is possible to notify that the speaker 3 has a failure and that the warning function does not temporarily or permanently work, and it is possible to eliminate the driver's preconception that because the vehicle approach warning sound is being emitted, the pedestrian should become aware of it.

Now, details of the abnormality detection in the speaker 3 of the present embodiment will be described in comparison with cases where abnormality detection is performed not based on the check usage output but based on a normal sound generator output.

Suppose that the above-described vehicle approach warning system performs abnormality detection based on the normal sound generator output. In this case, even if a voltage range at a time of the normal speaker 3 is used as the abnormality determination threshold and the abnormality detection is performed based on whether or not an output of the voltage sensor circuit 25 including the integration circuit is out of the voltage range, the above-described vehicle approach warning system cannot accurately perform the abnormality detection. This will be explained with reference to FIGS. 3 to 5.

FIG. 3(a) to FIG. 3(f) are diagrams illustrating a relation of variation in frequency (input frequency) of the sound generator output and impedance of the speaker 3 between respective abnormal modes and the normal state. FIG. 4(a) to FIG. 4(f) are diagrams illustrating a relation of variation in frequency of the sound generator output and frequency characteristic of the HPF 24 between respective abnormal modes and the normal state. FIG. 5(a) to FIG. 5(f) are diagrams illustrating the voltage applied to the speaker 3 (output voltage VOUT), the output voltage of the voltage sensor circuit 25 including the integration circuit (referred to herein as an integration circuit voltage), the integration circuit voltage averaged for making a determination with the threshold, and the voltage range being the abnormality determination threshold. The broken lines in FIG. 3 and FIG. 4 represent normal characteristics.

As shown in FIG. 3(a) to FIG. 3(f), the impedance of the speaker 3 varies in accordance with the abnormal modes. However, depending on a type of the abnormal mode, a variation in impedance of the speaker 3 is not always larger than that in the normal state. In particular, the vehicle approach warning sound has a range in frequency component and it is unknown at which input frequency within the range the abnormality detection is to be performed. Additionally, as shown in FIG. 4 (a) to FIG. 4(f), although the frequency characteristic of the HPF 24 also varies depending on the input frequency, the vehicle approach warning sound has a range in frequency component. Further, the integration circuit voltage varies depending on an amount of attenuation in the HPF 24, i.e., depending on the output voltage VOUT/the input voltage VIN. Thus, when the input frequency increases to some extent, the amount of attenuation in the HPF 24 becomes zero and a difference in integration circuit voltage between the normal state and the abnormal state disappears. As a result, it becomes difficult to distinguish between the normal state and the abnormal state based on the integration circuit voltage.

Specifically, as shown in FIG. 5(a) o FIG. 5(f), in the short-circuit, the output voltage VOUT applied to the speaker 3 is zero and the integration circuit voltage and the average voltage are also zero. In the open-circuit, the output voltage VOUT is larger than that in the normal state, and the integration circuit voltage and the average voltage are also sufficiently larger than those in the normal state. In these cases, the average voltage largely differs from the voltage range being the abnormality determination threshold, and thus, it is possible to certainly perform the abnormality detection.

However, in the medium short-circuit, in the freezing and fixing, and in the medium open-circuit, the output voltage VOUT is not zero and is not sufficiently larger than that in the normal state. Because of this, the integration circuit voltage and the average voltage do not differ than those in the normal state. The average voltage is within or close to the voltage range being the abnormality determination threshold, and thus, the abnormality detection cannot be performed reliably.

In view of this, the present embodiment uses the check usage output in performing the abnormality detection. As described above, the check usage output is set to the sound generator output with a frequency contained in the speaker resonance frequency band. The check usage output is outputted when the vehicle approach warning sound such as the pseudo engine sound, the pseudo motor sound or the like is not emitted. When this check usage output is generated, the abnormality detection is performed.

FIGS. 6(a) to 6(f) are diagrams illustrating a relation of variation in input frequency and impedance of the speaker 3 between respective abnormal modes and the normal state. FIGS. 7(a) to 7(f) are diagrams illustrating a relation of variation in frequency of sound generator output and frequency characteristic of the HPF 24 between abnormal modes and a normal state. FIGS. 8(a) to 8(f) are diagrams illustrating the output voltage VOUT, the integration circuit voltage, the average voltage, and the voltage range being the abnormality determination threshold in abnormal modes and the normal state. In FIG. 6 and FIG. 7, the broken lines show characteristics in the normal state.

As shown by the characteristic in the normal state in FIG. 6(d), there is a region in which, due to resonance phenomena, the impedance of the speaker 3 is larger than in other region. This region is the speaker resonance frequency band. A frequency of speaker output is set near and smaller than a resonance frequency f0. At the resonance frequency f0, the impedance of the speaker 3 is maximum in the speaker resonance frequency band.

As shown in FIGS. 7(a) to 7(f), the use of the frequency of this kind of check usage output means the use of the frequency whose attenuation amount varies among the normal state and respective abnormal modes. Thus, the integration circuit voltage, which varies depending on the attenuation amount in the HPF 24, also varies among the normal state and respective abnormal modes.

Therefore, as shown in FIGS. 8(a) to 8(f), in the short-circuit: the output voltage applied to the speaker 3 becomes zero; the integration circuit voltage and the average voltage also become zero; and the average voltage becomes smaller than the voltage range being the abnormality determination threshold. In the medium short-circuit: the output voltage VOUT attenuates more than in the normal state; the integration circuit voltage and the average voltage are smaller than those in the normal state; and the average voltage is smaller than the voltage range being the abnormality determination threshold. In the freezing and fixing: the output voltage VOUT attenuates more than in the normal state although the attenuation amount is smaller than that in the medium short-circuit; the integration circuit voltage and the average voltage are smaller than those in the normal state; and the average voltage is smaller than the voltage range being the abnormality determination threshold. In the medium open-circuit: the output voltage VOUT does not attenuates more than in the normal state; the integration circuit voltage and the average voltage are larger than those in the normal state; and the average voltage is larger than the voltage range being the abnormality determination threshold. In the open-circuit: the pull up of the voltage sensor circuit 25 dominates and the output voltage is sufficiently larger than that in the normal state; the integration circuit voltage and the average voltage are sufficiently larger than those in the normal state; and the average voltage is lager than the voltage range being the abnormality determination threshold.

By setting the frequency of the check usage output to a frequency within the resonance frequency band, it is possible to reliably perform the abnormality detection in all of the abnormal modes. It may be preferable that the frequency of the check usage output be set to a frequency smaller than the resonance frequency f0 at which the impedance of the speaker is maximum in the resonance frequency band. When the abnormality detection is made, the failure history information is recorded in the storage device 21c, wherein the failure history information indicates that the abnormality detection is made and further indicates whether the average voltage is smaller or larger smaller than the voltage range being the abnormality detection threshold. Because of this, contents of the failure history information stored in the storage device 21c can be used for the failure diagnosis in a repair factory of an automobile dealer or the like to improve service and the maintenance.

The resonance frequency of the speaker 3 is determined from size, shape and the like of the speaker 3. The sound generator output of the approach warning sound creation portion 21a of the microcomputer 21, a filter constant of the HPF, and the like are set, so that the output voltage VOUT in the resonance frequency band of the speaker 3 is generated.

As described above, the vehicle approach warning apparatus 2 emits the vehicle approach sound by putting the sound generator output, which is from the microcomputer, through the AMP 22 and the HPF 24 and applying the output voltage VOUT corresponding to the sound generator output to the speaker 3. The vehicle approach warning apparatus 2 includes the voltage sensor circuit 25 for monitoring the output voltage and generates the check usage output as the sound generator output at the time of the abnormality detection. Furthermore, the abnormality detection is performed based on whether the integration circuit voltage outputted from the voltage sensor circuit 25 is within or out of the voltage range being the abnormality determination threshold. In this way, in all of the abnormal modes, it is possible to reliably perform the abnormality detection.

(Other Embodiments)

In the above-described embodiment, the current sensor circuit 23 detects that the current supplied to the AMP 22 is an overcurrent. As an example of treatment in the case of the overcurrent, the stop of current supply to the AMP 22 is performed to temporarily stop the voltage application to the speaker 3. Alternatively, a detection result of the current sensor circuit 23 may be used in conjunction with a detection result of the voltage sensor circuit 24. Specifically, when the current sensor circuit 23 detects the overcurrent, the voltage application to the speaker 3 may be stopped if the abnormality is detected based on the integration circuit voltage outputted from the voltage sensor circuit 25.

In the above-described embodiment, the vehicle speed sensor is used to indicate a traveling state of the vehicle. However, based on a detection result of vehicle traveling state detecting means other than the vehicle speed sensor, the vehicle approach warning sound may be changed. For example, based on a detection signal of a sensor detecting an acceleration pedal operation degree (or engine revolution), the sound pressure level or the frequency of the vehicle approach warning sound may be changed.

According to embodiments of the present disclosure, a vehicle approach warning apparatus can be provided in various forms.

For example, a vehicle approach warning apparatus for emitting a vehicle approach warning sound from a sounding body mounted to a vehicle to warn about approach of the vehicle comprises: an approach warning sound waveform creation portion that generates a sound generator output corresponding to an approach warning sound waveform for creating the vehicle approach warning sound emitted from the sounding body; a power amplifier that generates an input voltage, which depends on the sound generator output; a high pass filter that outputs an output voltage by filtering a low frequency component of the input voltage inputted to the high pass filter, and that applies the output voltage to the sounding body; a voltage sensor circuit that includes an integration circuit for integrating the output voltage, and that outputs as an integration circuit voltage the output voltage integrated with the integration circuit; and an abnormality monitor portion that monitors the integration circuit voltage outputted from the voltage sensor circuit, and that performs abnormality detection in the sounding body based on the integration circuit voltage. When an abnormality of the sounding body is detected with the abnormality monitor portion, the vehicle approach warning apparatus vehicle alerts it via an alarm device. At a time of the abnormality detection, the approach warning sound waveform creation portion generates, as a check usage output, the sound generator output whose frequency is lower than a resonance frequency in a resonance frequency band of the sounding body. When the output voltage is applied to the sounding body via the power amplifier and the high pass filter based on the sound generator output generated as the check usage output at the time of the abnormality detection, the abnormality monitor portion performs the abnormality detection in the sounding body by making a comparison between a prestored abnormality determination threshold and an input of the integration circuit voltage, which is the output voltage integrated with the integration circuit.

This vehicle approach warning apparatus, which emits the vehicle approach warning sound by putting the sound generator output through the power amplifier and the high pass filter, includes the voltage monitor circuit for monitoring the output voltage and generates the check usage output as the sound generator output at the time of the abnormality detection. Additionally, the abnormality detection is performed based on whether the integration circuit voltage outputted from the voltage monitor circuit is within or out of the voltage range being the abnormality detection threshold.

The above vehicle approach warning apparatus may be configured such that the abnormality monitor portion performs the abnormality detection in the sounding body by calculating an average value of the integration circuit voltage and determining whether or not the average value is within a voltage range being the abnormality determination threshold.

Furthermore, the above vehicle approach warning apparatus may further comprise a current sensor circuit that detects a current supplied to the power amplifier from a power source. When the current sensor circuit detects that the current supplied to the power amplifier from the power source is an overcurrent, the vehicle approach warning apparatus may stop supply of the current from the power source to the power amplifier and stop application of the output voltage to the sounding body.

According to this configuration, when the current supplied to the power amplifier from the power source is the overcurrent, the supply of the current from the power source to the power amplifier and the application of the output voltage to the sounding body are stopped. Thereby, failure of the vehicle approach warning apparatus or sound generation of the sounding body with an unintended sound pressure due to the overcurrent can be prevented.

Furthermore, the vehicle approach warning apparatus may be configured such that: when the current sensor circuit detects that the current supplied to the power amplifier from the power source is the overcurrent, the application of the output voltage to the sounding body is stopped, provided that the abnormality monitor portion detects the abnormality based on the integration circuit voltage outputted form the voltage sensor circuit.

Furthermore, the vehicle approach warning apparatus may further comprise a storage device for recording failure history information when the abnormality monitor portion detects the abnormality of the sounding body.

By storing the failure history information in the storage device, it becomes possible to use contents stored in the storage device for failure diagnosis in a repair factory of an automobile dealer or the like to improve service and maintenance.

It is noted that embodiments, configurations and forms according to the prevent disclosure are not limited to the above-described respective embodiments, configurations and forms but include various modifications. Furthermore, embodiments, configurations and forms obtained by arbitrarily combining technical portions disclosed in the different embodiments, configurations and forms are also included in embodiments, configurations and forms according to the prevent disclosure.

The invention claimed is:

1. A vehicle approach warning apparatus for emitting a vehicle approach warning sound from a sounding body mounted to a vehicle to warn about approach of the vehicle, the vehicle approach warning apparatus comprising:
   an approach warning sound waveform creation portion that generates a sound generator output corresponding to an approach warning sound waveform for creating the vehicle approach warning sound emitted from the sounding body;
   a power amplifier that generates an input voltage, which depends on the sound generator output;
   a high pass filter that outputs an output voltage by filtering a low frequency component of the input voltage inputted to the high pass filter, and that applies the output voltage to the sounding body;
   a voltage sensor circuit that includes an integration circuit for integrating the output voltage, and that outputs as an integration circuit voltage the output voltage integrated with the integration circuit; and
   an abnormality monitor portion that monitors the integration circuit voltage outputted from the voltage sensor circuit, and that performs abnormality detection in the sounding body based on the integration circuit voltage, wherein:
   when an abnormality of the sounding body is detected with the abnormality monitor portion, the vehicle approach warning apparatus vehicle alerts it via an alarm device;
   at a time of the abnormality detection, the approach warning sound waveform creation portion generates, as a check usage output, the sound generator output whose frequency is lower than a resonance frequency in a resonance frequency band of the sounding body; and
   when the output voltage is applied to the sounding body via the power amplifier and the high pass filter based on the sound generator output generated as the check usage output at the time of the abnormality detection, the abnormality monitor portion performs the abnormality detection in the sounding body by making a comparison between a prestored abnormality determination threshold and an input of the integration circuit voltage, which is the output voltage integrated with the integration circuit.

2. The vehicle approach warning apparatus according to claim 1, wherein:
   the abnormality monitor portion performs the abnormality detection in the sounding body by calculating an average value of the integration circuit voltage and determining whether or not the average value is within a voltage range being the abnormality determination threshold.

3. The vehicle approach warning apparatus according to claim 1, further comprising
   a current sensor circuit that detects a current supplied to the power amplifier from a power source,
   wherein
   when the current sensor circuit detects that the current supplied to the power amplifier from the power source is an overcurrent, the vehicle approach warning apparatus stops supply of the current from the power source to the power amplifier and stops application of the output voltage to the sounding body.

4. The vehicle approach warning apparatus according to claim 3, wherein
   when the current sensor circuit detects that the current supplied to the power amplifier from the power source is the overcurrent, the application of the output voltage to the sounding body is stopped, provided that the abnormality monitor portion detects the abnormality based on the integration circuit voltage outputted form the voltage sensor circuit.

5. The vehicle approach warning apparatus according to claim 1, further comprising
   a storage device for recording failure history information when the abnormality monitor portion detects the abnormality of the sounding body.

* * * * *